United States Patent [19]
Bagley

[11] Patent Number: 5,745,943
[45] Date of Patent: May 5, 1998

[54] CABLE STRIPPING AND BENDING DEVICE

[76] Inventor: Wendell W. Bagley, 407 E. Washington, Tipton, Ind. 46072

[21] Appl. No.: 754,437

[22] Filed: Nov. 21, 1996

[51] Int. Cl.$^6$ ........................................................ B25F 1/00
[52] U.S. Cl. ............................... 7/107; 30/90.6; 81/9.4
[58] Field of Search .............................. 7/107; 30/90.1, 30/90.4, 90.6; 81/9.4

[56] References Cited

U.S. PATENT DOCUMENTS

| | | | |
|---|---|---|---|
| 3,092,906 | 6/1963 | Deering | 30/90.6 |
| 3,733,626 | 5/1973 | Allen . | |
| 3,750,281 | 8/1973 | Belling . | |
| 3,796,115 | 3/1974 | Dane . | |
| 3,813,966 | 6/1974 | Knuth . | |
| 3,875,601 | 4/1975 | Kaufman . | |
| 3,922,779 | 12/1975 | Cormier . | |
| 3,931,672 | 1/1976 | Siden . | |
| 4,026,017 | 5/1977 | Arnold | 30/90.6 |
| 4,027,557 | 6/1977 | Stepan . | |
| 4,060,891 | 12/1977 | Lerner . | |
| 4,083,105 | 4/1978 | ViPond | 7/107 X |
| 4,112,791 | 9/1978 | Wiener . | |
| 4,179,956 | 12/1979 | Gooley . | |
| 4,189,799 | 2/1980 | Litehizer | 7/107 |
| 4,215,470 | 8/1980 | Chirichigno . | |
| 4,271,729 | 6/1981 | Perrino et al. . | |
| 4,329,891 | 5/1982 | Bieganski . | |
| 4,395,928 | 8/1983 | Undin et al. . | |
| 4,449,298 | 5/1984 | Putz . | |
| 4,475,418 | 10/1984 | Tani . | |
| 4,557,164 | 12/1985 | Krampe . | |
| 4,577,405 | 3/1986 | Butler . | |
| 4,627,314 | 12/1986 | Wiebe et al. . | |
| 4,738,027 | 4/1988 | Bernier, Jr. et al. . | |
| 4,768,404 | 9/1988 | Bieganski . | |
| 4,835,862 | 6/1989 | Phillips | 7/107 X |
| 4,951,529 | 8/1990 | Laurencot . | |
| 4,969,703 | 11/1990 | Fyfe et al. . | |
| 5,062,192 | 11/1991 | Sawyer et al. . | |
| 5,101,693 | 4/1992 | Chambers . | |
| 5,172,620 | 12/1992 | Faust . | |
| 5,265,339 | 11/1993 | Nilsson . | |
| 5,301,426 | 4/1994 | Regan . | |
| 5,337,633 | 8/1994 | Carpenter et al. . | |
| 5,361,489 | 11/1994 | Vatel . | |
| 5,414,931 | 5/1995 | Wollermann . | |
| 5,435,029 | 7/1995 | Carlson et al. | 7/107 |
| 5,479,701 | 1/1996 | Yamano et al. . | |
| 5,491,894 | 2/1996 | Bieganski . | |
| 5,507,207 | 4/1996 | Benoit et al. . | |
| 5,517,882 | 5/1996 | Hoffa . | |

*Primary Examiner*—James G. Smith
*Attorney, Agent, or Firm*—Woodard, Emhardt, Naughton, Moriarty & McNett

[57] ABSTRACT

A cable stripping and bending device. The device is a tool with no moving parts. The cable is inserted into a rounded recess where the sheath is cut longitudinally of the cable by a cutting blade which is fixed to the tool and projects into the rounded recess. The insulation is cut and stripped by additional cutting blades fixed to the tool and projecting in a V-shaped recess. The ends of the conductors are bent by pivoting the tool with the ends of the conductors inserted into a bore in the tool.

12 Claims, 7 Drawing Sheets

CABLE STRIPPING AND BENDING DEVICE

The present invention relates in general to a hand tool and in particular to a cable stripping and bending device.

BACKGROUND OF THE INVENTION

It is a common practice in the construction industry as well as with the do-it-yourselfer to strip the insulation from electrical cables and wires by cutting and scraping frequently with a pocket knife. This method is time consuming and requires a substantial amount of practice before becoming proficient. Also there is the danger of damaging the insulation on the wires and also the danger of cutting or damaging the conductor portion of cable.

In the wiring of a house or building the cable is normally placed in the wall of the building in such a manner that its end or ends project from a light switch or receptacle box. The electrician or do-it-yourselfer then prepares the end or ends of the cable by stripping appropriate portions of the insulation and attaching the conductors to respective terminals. The cable used in such buildings is frequently available in three sizes the largest being 10/2, the smallest being 14/2 and the intermediate being 12/2. Such cable is provided with three conductors one of which, the center conductor, serves as a ground wire. Typically the wires are stripped and then bent into a curved shape so as to seat around a screw which is tightened to secure the conductor to a terminal. Typically such bending of the end of the conductor is accomplished by a pair of pliers because the conductor being solid is relatively stiff.

Various devices have been proposed for stripping the insulation from insulated wire. One example of a device for stripping insulation from cable is disclosed in the U.S. Pat. No. 5,062,192 to Sawyer. This device includes moving parts. While this device appears to be designed so as to effectively remove the outer insulation from the cable and the inner insulation from the conductors, it does not include means for bending the ends of the conductors. Further, the device appears to be relatively complicated in that it includes moving parts and relatively bulky so that it could not be easily slipped into the pocket of the electrician or do-it-yourselfer.

It is an object of the present invention to provide an improved cable stripping and bending device.

A further object is to provide an improved method for stripping insulation from cable and bending the cable conductors for mounting.

SUMMARY OF THE INVENTION

One embodiment of the invention might include the method of stripping insulation from electrical cable and bending the conductors for mounting by using a member having a rounded recess and a first cutting blade mounted on the member and projecting into the rounded recess. There is also provided second and third cutting blades mounted on the member and projecting toward one another with each of the cutting blades having a cutting edge which faces towards the other respective cutting edge and are spaced apart by a varying distance. The member has a bore therethrough. The steps of the method include projecting the cable through the rounded recess and moving the member relative to the cable with the first cutting blade against the cable sheath to produce a cut through the sheath extending longitudinally of the cable at the end of the cable. Next the sheath is cut off at the end of the cable with at least the second cutting blade. A further step includes stripping the individual conductors in the cable by cutting through the insulation on the individual conductors with at least the second cutting blade and forcing the insulation off of the end of the individual conductors. Finally a loop is formed on the end of each of the individual conductors by placing the end of the conductor through the bore and pivoting the member relative to the cable.

One embodiment of the cable stripping and bending device of the invention might include a member having a rounded recess and a first cutting blade mounted on said member and projecting into the rounded recess. There is also provided second and third cutting blades which are mounted on the member and project towards one another. Each of the cutting blades has a cutting edge with each of said cutting edges facing toward one another and spaced apart a varying distance. There is also provided a bore extending through the member.

Figure 8:
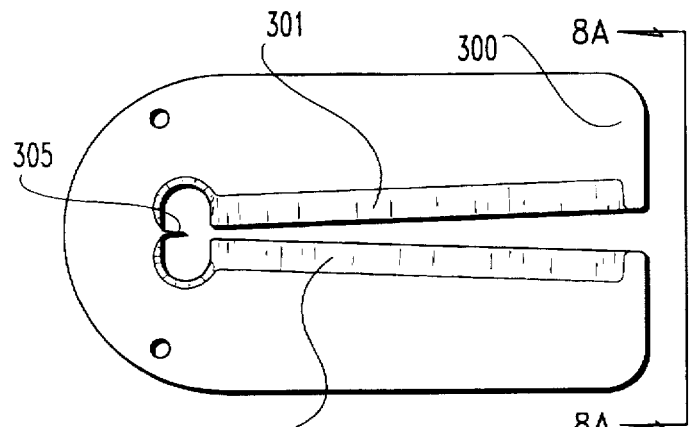
FIG. 8 is a top plan view of still another embodiment of the invention.

FIG. BA is an enlarged end view taken along the line 8A of FIG. 8 in the direction of the arrows.

FIGS. 9, 10, 11, 12, 13 and 14 are serial perspective views showing various steps in the method of the present invention.

Figure 15:
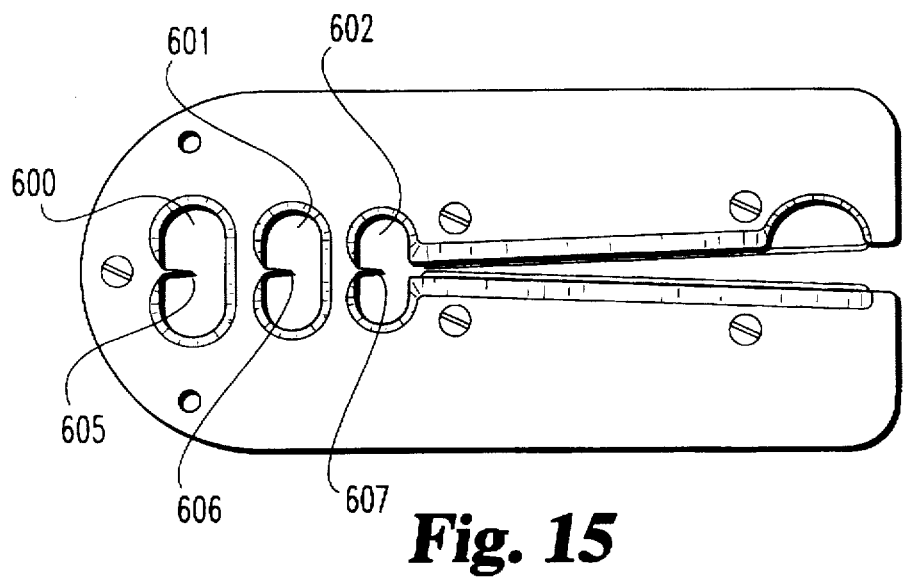

FIG. 15 is a top plan view of an alternative embodiment of the invention.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
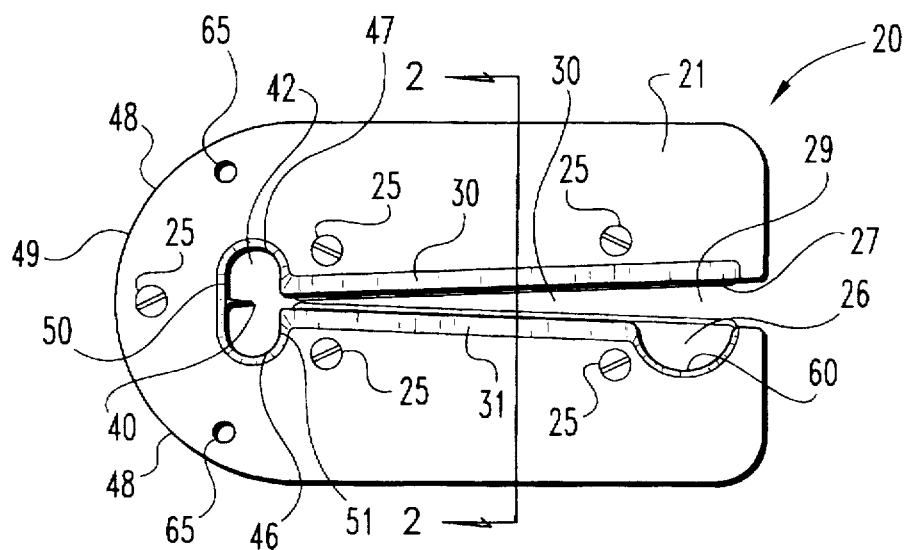
FIG. 1 is a top plan view of a first preferred embodiment of the invention.
Figure 2:
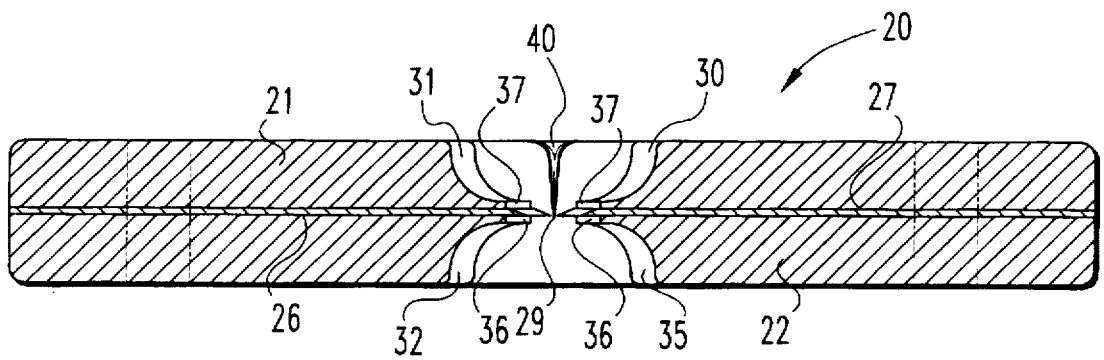
FIG. 2 is an enlarged section taken along the line 2—2 of FIG. 1 in the direction of the arrows.
Figure 3:
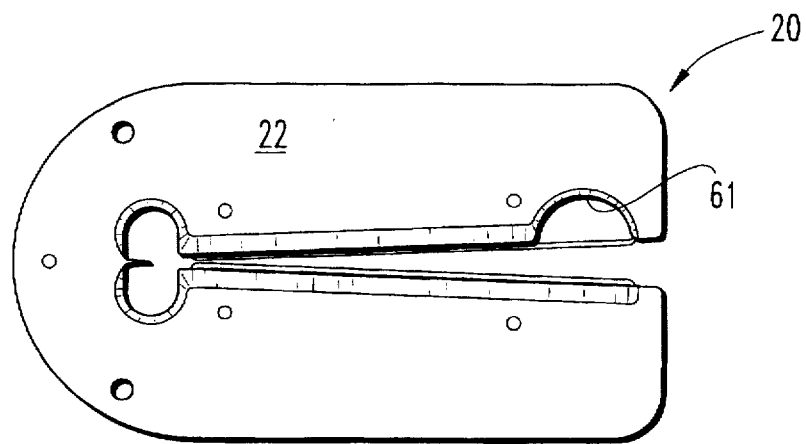
FIG. 3 is a bottom plan view of the embodiment of FIGS. 1 and 2.

Referring now to the drawings and particularly to FIGS. 1-3 there is illustrated a cable stripping and bending device which includes a flat elongated member 20. Member 20 includes a pair of flat elongated elements 21 and 22 which are fixed together by screws 25 with cutting blades 26 and 27 secured between the flat elements 21 and 22. The cutting blades 26 and 27 have cutting edges which face toward one another and define a V shape as illustrated in FIGS. 1 and 3.

The cutting blades project from their mounting on the member 20 into a V-shaped recess 29 which extends longitudinally of the member 20. The blades 26 and 27 for the most part project a distance from the member 20 which is equal to the thickness of the insulation in the cable which is being stripped. The flat elements 21 and 22 are tapered at 30, 31, 32 and 35 so that the portion of the cutting blades projecting from the member 20 into the V-shaped recess has a relatively narrow shoulder 36 and 37 on either side of the cutting blades. This construction insures that the blades be projected sufficiently deeply into the insulation of the conductor so as to properly remove the insulation from the conductor.

There is also provided a further cutting blade 40 which in the embodiment of FIGS. 1-3 is formed on the flat element 21. The cutting blade 40 projects into a rounded recess 42 which opens into the V-shaped recess 30. The rounded recess 42 has generally the external shape and configuration of the cable 45 (FIG. 9), that is, it is rounded at 46 and 47 and has flat surfaces at 50 and 51. The tool of the present invention can be used with cable of varying sizes including, for example, the sizes 10/2, 12/2 and 14/2 all of which will fit into the rounded recess 42. In the illustrated embodiment the cutting blade 40 extends perpendicularly to the flatness of the member 20. However, the blade may be tilted slightly to a plane projecting towards the center of the rounded recess 42 with the blade being spaced slightly away from the center and to one side of the rounded recess. The purpose of giving the slight tilt and spacing of the blade is to locate it for better cutting the cable at the center of the outer insulation of the cable.

The flat elements 21 and 22 are formed with half moon recesses 60 and 61, respectively, which are aligned with one another and allow a very substantial portion of the blade 26 to be available for cutting off the outer insulation 46 of the cable 45. As mentioned above, the blades 26 and 27 for the most part project a distance from the member 20 which is equal to the thickness of the insulation in the cable which is being stripped. The only place where this is not true is the half moon recesses 60 and 61.

The tool of the present invention can be manufactured in various sizes however one embodiment of the device has a length of the member 20 of approximately 3-⅛ inches, a width of 1-⅞ inches and a thickness of approximately ¼ inch. In that embodiment the width of the rounded recess 42 (from surface 50 to surface 51) is about ¼ inch and the length is 9/16 inch while the diameter of the half moon recess 60 is approximately 9/16 inch. A pair of bores 65 are provided in member 20 and extend completely through the member. These bores have a diameter slightly larger than the conductor 66 and 67 and the ground wire 70 of the cable 45. Also each bore is spaced a predetermined distance from the edge 48 of the member 20. The edge 48 of the member 20 is rounded at 49 in a generally semicircular shape.

Figure 4:
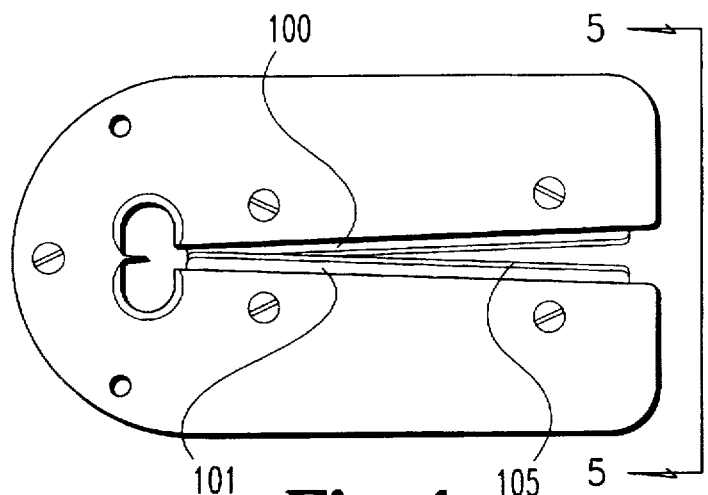
FIG. 4 is a top plan view of an alternative embodiment of the invention.
Figure 5:
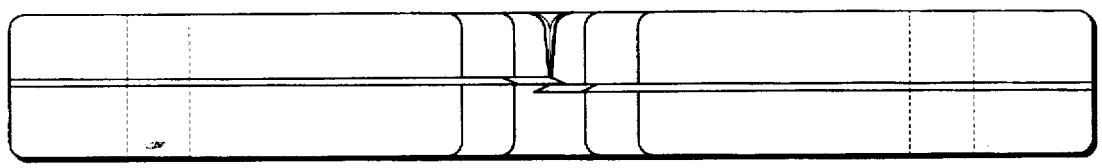
FIG. 5 is an enlarged end view taken along the line 5—5 in the direction of the arrows.
Figure 6:
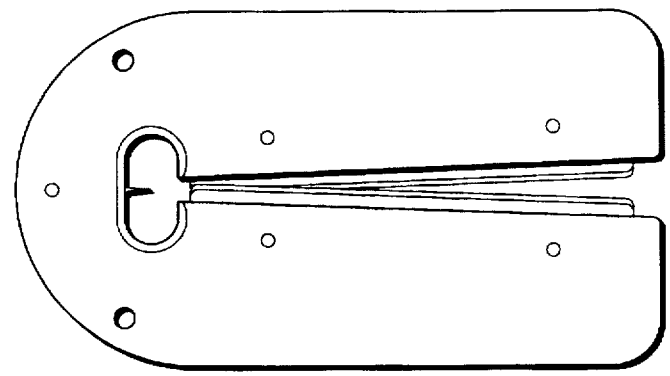
FIG. 6 is a bottom plan view of the embodiment of FIGS. 4 and 5.

Referring to FIGS. 4, 5 and 6 an alternative embodiment of the invention as illustrated which is generally the same as the embodiment of FIGS. 1-3 but includes cutting blades 100 and 101 which project from the member 102 a greater distance than the cutting blades 26 and 27. Also the cutting blades 100 and 101 are overlapping at the narrowest portion of the V-shaped recess 105. Further the embodiment of FIGS. 4-6 does not include the half moon recess 60 and 61 for cutting off of the external sheath of the cable. Instead the cable sheath is cut off by use of the cutting blades 100 and 101 which extend a sufficient distance into the V-shaped recess to accomplish such cutting without such a half moon recess.

Figure 7:
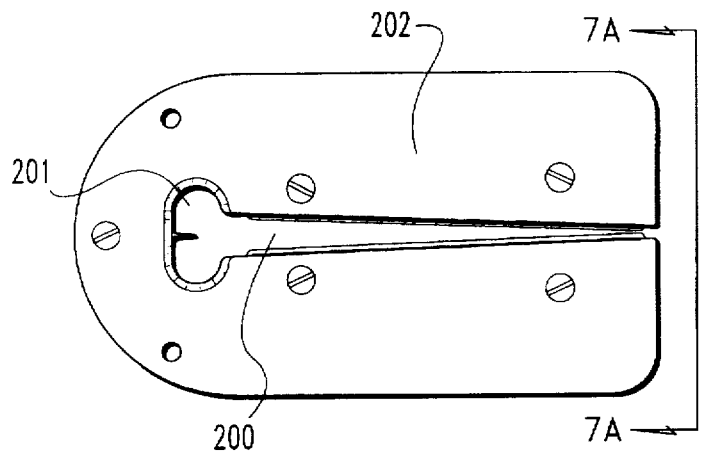
FIG. 7 is a top plan view of a further embodiment of the invention.
Figure 7A:
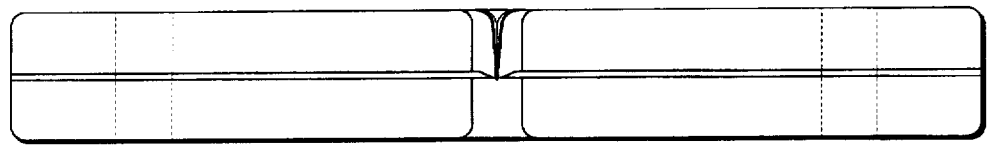
FIG. 7A is an enlarged end view taken along the line 7A of FIG. 7 in the direction of the arrows.

Referring to FIGS. 7 and 7A still another alternative embodiment of the invention is illustrated which is generally the same as the embodiment illustrated in FIGS. 1-3 with the exception that the V-shaped recess 200 extends oppositely to the V-shaped recess 30 so that the larger end of the V-shaped recess opens into the rounded recess 201. The preferred embodiment of the invention has the recess opening externally of the member 202 i.e. as shown in the member 20 in FIG. 1 because it is not then necessary to insert the end of the cable through the rounded recess prior to performing operations on the cable. Also the embodiment of FIGS. 7 and 7A does not have the half moon recess in the illustration although it can be provided if desired. The embodiment of FIGS. 7 and 7A is designed to reduce the possibility of cutting the fingers of the person who carries it in his or her pants pocket.

Figure 8A:
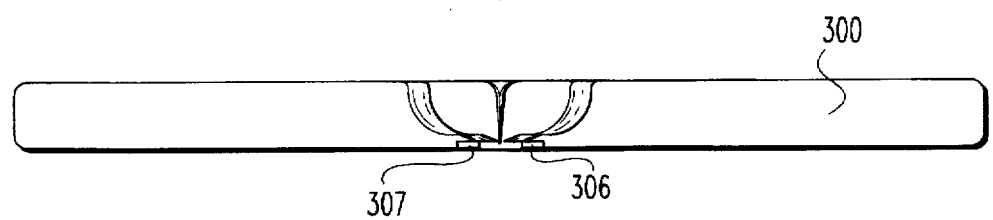
Figure 9:
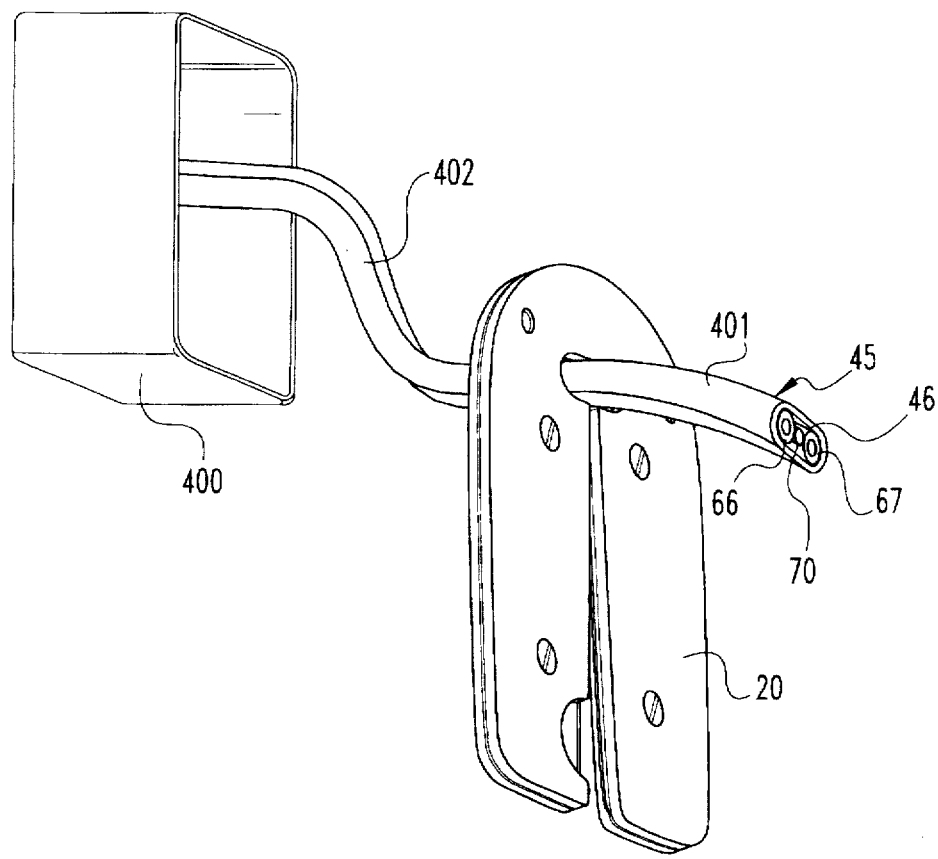

FIG. 8 and 8A illustrate still another alternative embodiment of the invention which is similar or identical to the embodiment of FIGS. 1-3 with the exception that the member 300 is made of a single element rather than of two elements as of the embodiments above described. Further the cutting blades 301 and 302 are formed directly in the member 300 similarly to the cutting blade 305. Also as illustrated in FIG. 8A each of the cutting blades 301 and 302 have a single shoulder 306 and 307 thereon which shoulder is spaced from the cutting edge of the blade an appropriate distance for cutting into the insulation of the conductors but not cutting into the metal of the conductors.

Figure 10:
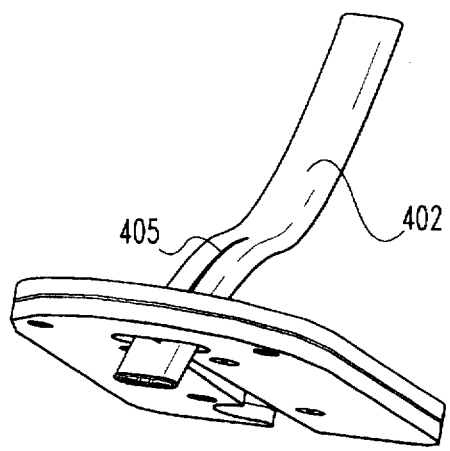

Referring now to FIGS. 9-14 the method of the present invention may be accomplished with the cable 45 extending from a receptacle box 400. The member 20 is placed over the end 401 of the cable 45 by projecting the cable through the rounded recess 42. The user of the device then pulls the device toward the user and away from the receptacle box 400 with the cutting blade 40 against the cable sheath 402 so as to produce the cut 405 which extends longitudinally of the cable. FIG. 10 shows this step with the slit 405 partially cut in the cable. The cutting action is continued by pulling the tool along the cable until the tool is moved past the end of the cable leaving the slit 405 in the sheath.

Figure 11:
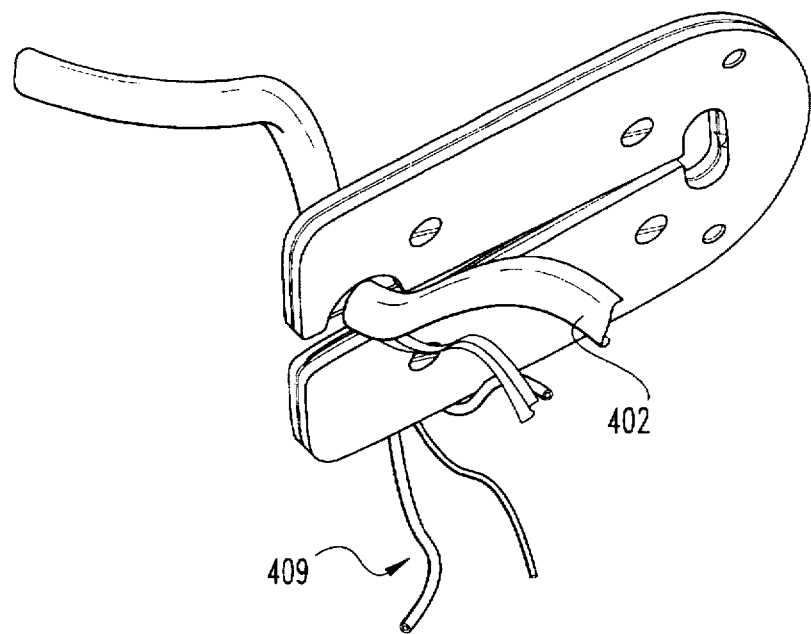
Figure 12:
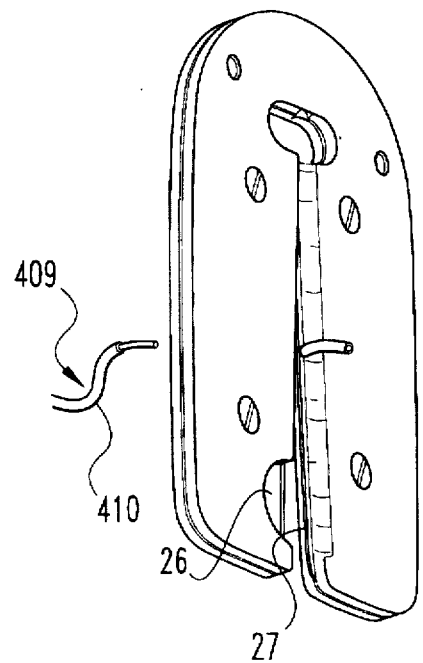

The sheath 402 can then be separated from the conductors 66, 67 and 70 as shown in FIG. 11 and can be cut off by use of the blade 26 by rotating the tool and forcing it against the projecting portion of the sheath 402 to remove that portion. Next the individual conductors are stripped by cutting through the insulation on the individual conductors with the second cutting blade and forcing the insulation off of the end of the individual conductors. This is shown in FIG. 12 as an example where a single conductor is being stripped by the use of the cutting blades 26 and 27. In order to accomplish this step the tool is forced down on the individual conductor 409 with its insulation 410 until the blades 26 and 27 project through the insulation. As explained above the blades 26 and 27 project from the member 20 only a sufficient distance that the shoulders 36 and 37 will engage the insulation with the blades only just touching the conductor inside of the insulation. The tool is then rotated or pivoted relative to the conductor until the insulation is cut and then the insulation is pulled off of the end of the conductor as illustrated in FIG. 12 by moving the tool longitudinally of the conductor.

Figure 13:
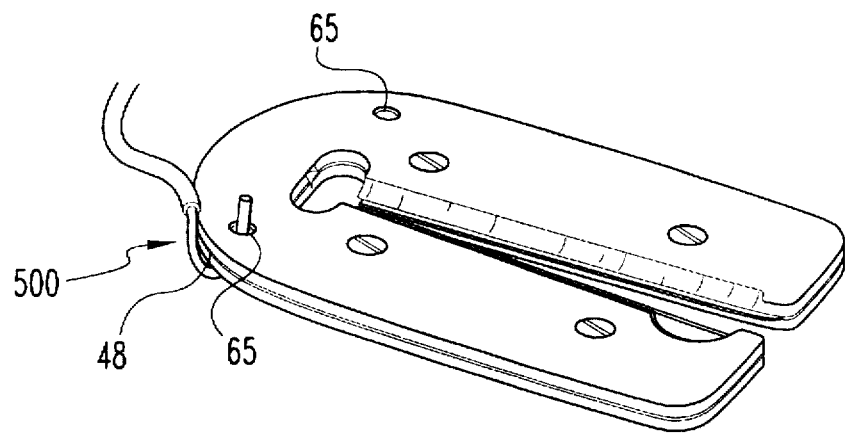
Figure 14:
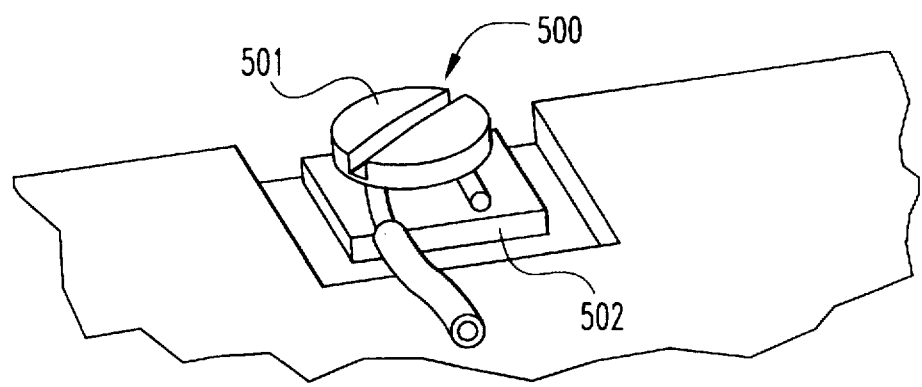

Finally the tool is used to form a loop on the end of the individual conductors by placing the end of the conductor though the bore 65 as illustrated in FIG. 13 and pivoting the tool or member relative to the cable so as to produce the 180° loop 500 illustrated in FIG. 13 and FIG. 14. FIG. 14 shows the conductor being mounted on a screw 501 which can be screwed into the terminal 502 to make the electrical connection between the conductor and the terminal. The bore 65 is spaced from the edge 48 of the member 20 a predetermined distance appropriate and equal to the sharpness of curvature desired in the loop 500.

It will be evident from the above description that the present invention provides an improved tool for preparing the end of an electrical cable for mounting to the terminal box. The tool is very simple and has no moving parts and can easily be inserted in the pocket of the electrician or do-it-yourselfer. Furthermore the tool not only permits the user to strip the insulation from the various conductors to strip the sheath from the cable but it also permits bending of the ends of the conductors for mounting on the terminal.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, another embodiment of the invention might involve providing three rounded recesses 600, 601 and 602 instead of the single rounded recess 42. The three rounded recesses are specifically sized to fit the three cable sizes 10/2, 12/2 and 14/2 so as to make more certain that the tool does not damage the conductors during stripping. The size of the blades 605, 606 and 607 can also be accurately determined in relation to the sizes of cable and the recesses 600, 601 and 602 to insure accurate cutting and stripping.

What is claimed is:

1. A cable stripping and bending device comprising:

a flat elongated member having a V-shaped recess therein extending longitudinally of the elongated member, said flat elongated member having a first rounded recess which opens into the V-shaped recess, a first cutting blade mounted on said flat elongated member and projecting into said rounded recess, and second and third cutting blades mounted on said flat elongated member so as to project toward one another within said V-shaped recess, each of said cutting blades having a cutting edge with each of said cutting edges facing toward one another and defining a V-shape, said flat elongated member having a rounded end and a bore extending through the flat elongated member perpendicularly of the flatness of the flat elongated member, said bore being spaced a predetermined distance from the rounded end of said flat elongated member.

2. The cable stripping and bending device of claim 1 wherein said V-shaped recess tapers from a smallest end located at said rounded recess to a largest end located away from said rounded recess and externally of said member.

3. The cable stripping and bending device of claim 1 wherein said V-shaped recess tapers from a smallest end located away from said rounded recess and externally of said member to a largest end located at said rounded recess.

4. The cable stripping and bending device of claim 1 wherein the member and cutting blades are integral.

5. The cable stripping and bending device of claim 1 wherein the flat elongated member comprises a pair of flat elements fixed to one another with the second and third cutting blades fixed therebetween.

6. The cable stripping and bending device of claim 1 wherein said member has shoulders thereon extending adjacent to said second and third cutting blades for limiting the depth that said blades project into insulation surrounding a conductor.

7. The cable stripping and bending device of claim 1 wherein said member has an additional rounded recess and an additional cutting blade mounted on said member and projecting into said additional rounded recess, said additional recess being larger than said first rounded recess.

8. A method of stripping insulation from electrical cable and bending the conductors for mounting by using a member having a rounded recess, a first cutting blade mounted on said member and projecting into said rounded recess, second and third cutting blades mounted on said member and projecting toward one another, each of said cutting blades having a cutting edge which face toward one another and are spaced apart a varying distance, said member having a bore extending therethrough, said method comprising the steps of (a) projecting the cable through the rounded recess (b) moving the member relative to the cable with the first cutting blade against the cable sheath to produce a cut through the sheath extending longitudinally of the cable at the end of the cable (c) cutting off the sheath at the end of the cable with the second cutting blade (d) stripping the individual conductors in the cable by cutting through the insulation on the individual conductors with the second cutting blade and forcing the insulation off of the end of the individual conductors and (e) forming a loop on the end of each of the individual conductors by placing the end of the conductor through the bore and pivoting the member relative to the cable.

9. The method of claim 7 wherein the individual conductors are moved against the second and third cutting blades a sufficient distance to cause the blades to cut into the insulation on the individual conductors without damaging the conductors.

10. The method of claim 9 wherein the loop extends through approximately 1800.

11. The method of claim 10 wherein the end of the cable is projecting out of an electrical outlet box.

12. A cable stripping and bending device comprising:

a member having a rounded recess, a first cutting blade mounted on said member and projecting into said rounded recess, second and third cutting blades mounted on said member and projecting toward one another, each of said cutting blades having a cutting edge which face toward one another and are spaced apart a varying distance, said member having a bore extending through said member.

* * * * *